United States Patent
Metcalf et al.

(10) Patent No.: US 7,186,308 B2
(45) Date of Patent: Mar. 6, 2007

(54) SYSTEM AND METHOD FOR PROVIDING TIRE ELECTRONICS MOUNTING PATCHES

(75) Inventors: Arthur Richard Metcalf, Greenville, SC (US); Jay Clifford Sinnett, Greenville, SC (US); George Phillips O'Brien, Piedmont, SC (US)

(73) Assignee: Michelin Recherche et Technique S.A. (CH)

( * ) Notice: Subject to any disclaimer, the term of this patent is extended or adjusted under 35 U.S.C. 154(b) by 388 days.

(21) Appl. No.: 10/681,931

(22) Filed: Oct. 9, 2003

(65) Prior Publication Data

US 2005/0076992 A1 Apr. 14, 2005

(51) Int. Cl.
*B29D 30/06* (2006.01)
*B29C 65/48* (2006.01)
*B60C 23/00* (2006.01)

(52) U.S. Cl. ............... 156/123; 152/152.1; 264/272.21

(58) Field of Classification Search ............ 156/110.1, 156/123; 152/152.1; 340/442, 447; 264/272.21
See application file for complete search history.

(56) References Cited

U.S. PATENT DOCUMENTS

| | | | |
|---|---|---|---|
| 5,228,686 A * | 7/1993 | Maleyko | 473/570 |
| 5,731,754 A * | 3/1998 | Lee et al. | 340/447 |
| 5,749,984 A * | 5/1998 | Frey et al. | 152/415 |
| 5,877,679 A | 3/1999 | Prottey | |
| 6,030,478 A | 2/2000 | Koch et al. | |
| 6,087,930 A | 7/2000 | Kulka et al. | |
| 6,192,746 B1 | 2/2001 | Wilson | |
| 6,255,940 B1 | 7/2001 | Phelan et al. | |
| 6,309,494 B1 | 10/2001 | Koch et al. | |
| 6,388,567 B1 | 5/2002 | Bohm et al. | |
| 6,438,193 B1 * | 8/2002 | Ko et al. | 377/24.1 |
| 6,462,650 B1 | 10/2002 | Balzer et al. | |
| 6,474,380 B1 * | 11/2002 | Rensel et al. | 152/152.1 |
| 6,705,365 B1 | 3/2004 | Wilson | |
| 2002/0124934 A1 | 9/2002 | Koch et al. | |
| 2004/0094251 A1 | 5/2004 | Strache et al. | |
| 2004/0159383 A1 * | 8/2004 | Adamson et al. | 152/152.1 |

FOREIGN PATENT DOCUMENTS

| | | |
|---|---|---|
| BR | 0002146 A | 10/2000 |
| CA | 2305856 A1 | 10/2000 |
| DE | 19522269 A1 | 1/1997 |
| DE | 10255138 A1 | 6/2004 |
| EP | 0829382 A2 | 3/1998 |
| EP | 1048492 A2 | 11/2000 |
| JP | 2000355202 A | 12/2000 |
| WO | WO 2005035278 A2 | 4/2005 |
| ZA | 200001879 A | 10/2000 |

* cited by examiner

*Primary Examiner*—Geoffrey L. Knable

(57) ABSTRACT

A method of making a mounting patch for mounting an electronic assembly in the inner liner or a pneumatic tire includes the steps of providing a power source, embedding the power source into a quantity of uncured rubber, and curing the uncured rubber by applying sufficient heat and pressure to the uncured rubber such that the power source is secured in the rubber. The provided power source may correspond to one or more batteries. Additional components that may be incorporated with the mounting assembly may include at least one conductive element, which may also be embedded into the quantity of uncured rubber. An antenna may be configured with undulations to allow longitudinal stretching of the antenna and then also embedded into the quantity of uncured rubber. A preferably non-conductive adhesive layer may be applied to selected portion of the power source, conductive element, and/or the antenna before the step of embedding in the uncured rubber.

26 Claims, 4 Drawing Sheets

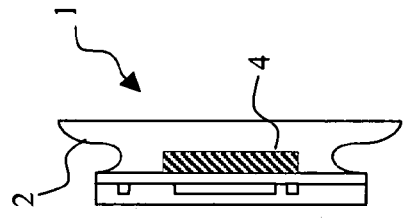
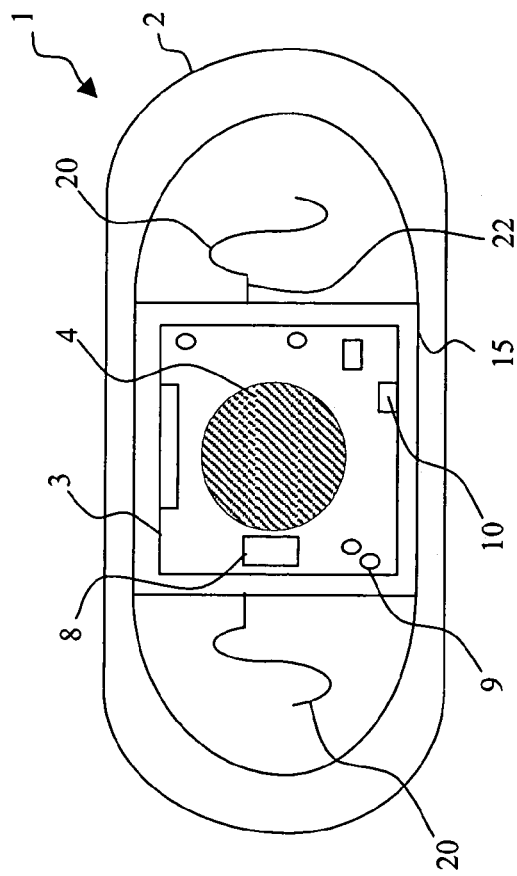
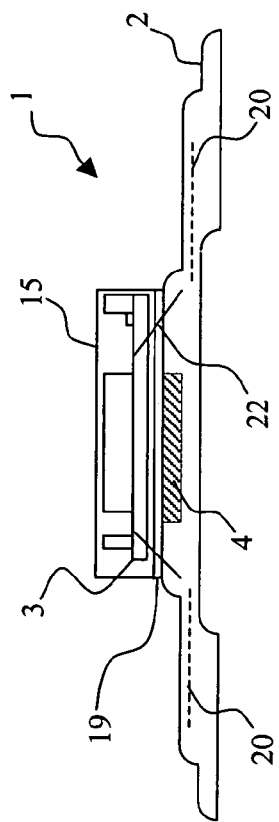

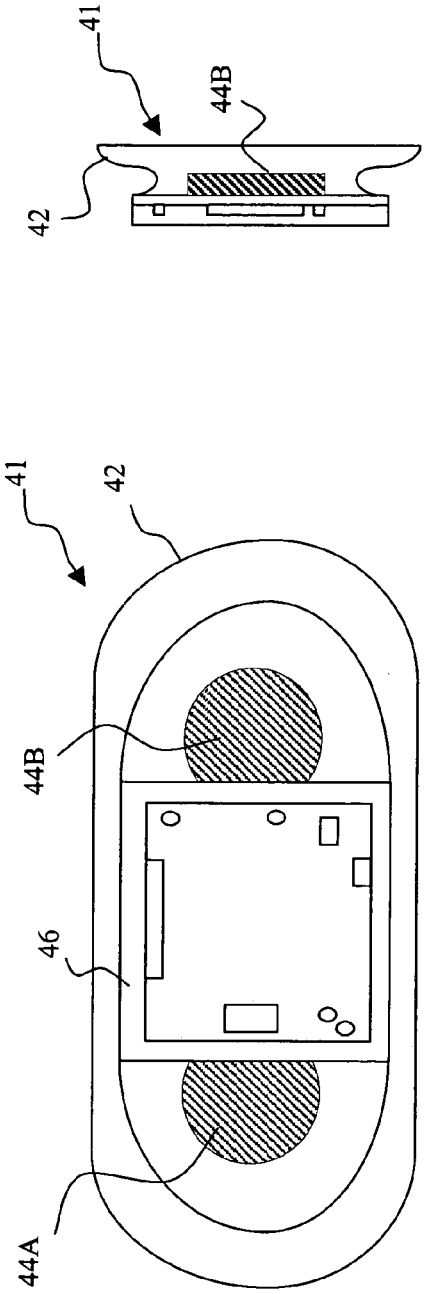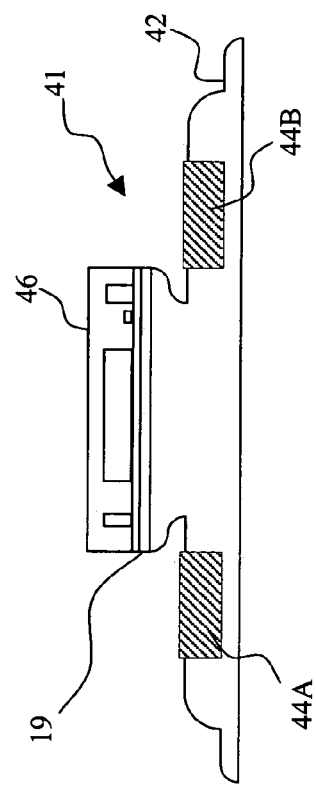
Figure 4
Figure 5
Figure 6

SYSTEM AND METHOD FOR PROVIDING TIRE ELECTRONICS MOUNTING PATCHES

FIELD OF THE INVENTION

The present invention generally concerns a system and method for installing electrical and electronic components and assemblies in a tire. The subject matter disclosed relates to techniques and apparatus for housing and mounting power source(s), circuit boards, and other electronic devices on and within so called "patch" elements within a tire.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels.

A potential capability offered by electronics systems integrated with tire structures is asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment.

U.S. Pat. No. 6,388,567 (Bohm et al.) discloses a monitoring device and patch combination used to monitor the conditions of a tire. The patch portion houses an antenna and is securely mounted to the innerliner of a tire. The monitoring portion, which may be separately fabricated from the patch portion, includes sensors and other circuitry to monitor various parameters related to the tire and includes a battery fully encased with the monitoring circuitry. Another example of a mounting arrangement for an electronic tire monitoring-system can be found in U.S. Pat. No. 6,309,494 (Koch et al. '494), which concerns a method of attaching electronic equipment to the inner surface of a tire. The method involves the use of an epoxy adhesive to directly bond the monitoring device to the inner surface of the innerliner of the tire.

Yet another example of a mounting arrangement for an electronic tire monitoring system can be found in U.S. Pat. No. 6,255,940 (Phelan et al.), which discloses another patch and monitoring device combination. The patch portion of the combination includes a nut secured within a central portion of the patch for receiving a matching bolt. The monitoring portion of the combination includes a module containing various sensors, a battery and other circuitry all encased in an epoxy and glass bead mixture. Mounted within this module is a nut, similar to the nut contained within the patch portion, such that the monitoring portion may be attached to the patch portion after the patch portion is securely attached to an inner surface of the tire. A further example of a mounting arrangement for an electronic tire monitoring system can be found in U.S. Pat. No. 6,087,930 (Kulka et al.) which discloses an active integrated circuit transponder and sensor apparatus all encased in a unitary housing. The monitoring system includes an integral battery and the entire arrangement may be inserted directly within the sidewall of a tire to be monitored or configured as a patch so be secured to an inside surface of the tire to be monitored.

Yet a further example of a mounting arrangement for an electronic tire monitoring system can be found in U.S. Pat. No. 6,030,478 (Koch et al. '478), which discloses a method and apparatus permitting the insertion and removal of an electronic monitoring device from a tire. Such patent discloses a technique wherein a vulcanized rubber patch is permanently assembled to the inner liner of a tire and an electronic monitoring device, which has been encapsulated in a rigid potting material and fitted with a battery, is inserted into a cavity in the patch.

The disclosures of all of the foregoing United States patents are hereby fully incorporated into this application for all purposes by reference thereto.

One concern associated with the use of tire monitoring patch and electronics combinations like those of the above-noted prior art involves the secure attachment of the combinations to the tire. As in the cases of Bohm et al., Phelan et al., and Koch et al. '478 noted hereinabove, a solution has been provided involving the use of a separate supporting/attachment patch and a physically separate electronics package or module. Alternatively, other solutions to the attachment problem provide unitary devices that may be directly secured to the tire as in Koch et al. '494 and Kulka et al.

A second concern associated with the use of tire monitoring patch and electronics combinations like those of the above-noted prior art results from the inclusion of a relatively heavy battery within the electronics package or module. The need to support a relatively heavy battery together with the other circuitry associated with the electronics portion of the tire monitoring and electronics combination requires a physically robust mounting structure such as, for example, the nut and bolt arrangement of Phelan et al.

Another concern associated with tire monitoring patch and electronics combinations relates to wireless signal transmission from an RF device associated with the tire electronics to a receiver external to the tire. Often the signal path through the tire and mounting structures is degraded, sometimes in part due to the materials and configuration of the tire and mounting structures for the antennas associated with the data transmitters within the electronics portion of the monitors. Effective signal propagation in hardwired connections among electronic devices in a tire must also preferably be ensured.

Yet another concern associated with tire monitoring patch and electronics combinations relates to the fact that the patch or mounting portion of the combination must be flexible in order to adapt to the rotational movement of the tire while in use. Because of this required flexibility, care must be taken that the internal connections of the electronic circuitry are not disrupted or impaired due to continual flexing of the patch.

While various tire monitoring patch and electronics systems have been developed, no one design has emerged that generally addresses all of the above-referenced concerns and that encompasses all of the desired characteristics as hereafter presented in accordance with the subject technology.

SUMMARY OF THE INVENTION

In view of the recognized features addressed by the present subject matter, an improved system and method for mounting devices, such as electronic components, in a tire interior has been developed. Generally, a modular mounting assembly includes a two-part combination of a patch mounting portion and an electronics portion. A power supply may also be incorporated with certain embodiments of the disclosed modular assembly technology.

Various features and aspects of the subject modular mounting assemblies and tire electronics applications offer a plurality of advantages. The disclosed modular mounting assembly is provided with significant design versatility since the patch mounting portion can be used to mount a plurality of different devices. Exemplary electronic devices may include such components as condition-responsive devices including transducers, acoustic devices, sensors, etc. for sensing certain environmental conditions such as temperature and/or pressure, tire revolution counters, vehicle speed sensors, sidewall deflection sensors, tire displacement sensors, microprocessors, memory modules, RFID transponders, light assemblies, data transmitters and/or receivers, and power supply components.

Another advantage in accordance with certain embodiments of the present technology lies in providing improved technology for mounting a battery used to power tire electronics systems. A significant improvement disclosed by the present technology in light of known designs is that a relatively heavy battery is relocated to the patch-mounting portion of the tire electronics system from its previous position in combination with the electronics portion of the tire electronics system. Such positioning of the battery results in an overall structure with a lower center of gravity than previous tire electronics assemblies, thus having increased mechanical stability and survivability in a tire environment.

Yet another advantage in accordance with certain embodiments of the presently disclosed technology is that techniques are provided for increasing the transmission range of a data transmitter within the electronics portion of the subject modular mounting assemblies. This corresponds in one embodiment of the present technology to utilization of a non-conductive rubber or elastic material to encapsulate the antenna(s) and other selected electronic components.

A still further advantage of certain embodiments of the present subject matter is that continued reliable operation of the tire electronics system is facilitated despite the continual flexing of the mounting patch portion of the modular mounting assembly during tire rotation and corresponding normal operation of the device. This corresponds in one exemplary embodiment to the utilization of conductive springs to interconnect various electrical components of the tire electronic system. In another exemplary embodiment, a flexible conductive elastomer or a fatigue-resistance metal is used to interconnect various electronic components (such as an RF device to an antenna).

In one exemplary embodiment of the presently disclosed technology, a method of making a mounting patch for mounting an electronic assembly in the inner liner or a pneumatic tire includes the steps of providing a power source, embedding the power source into a quantity of uncured rubber, and curing the uncured rubber by applying sufficient heat and pressure to the uncured rubber such that the power source is secured in the rubber. The provided power source may correspond to one or more batteries.

Additional components that may be incorporated with the mounting assembly may include at least one conductive element, which may also be embedded into the quantity of uncured rubber. An antenna may be configured with undulations to allow longitudinal stretching of the antenna and then also embedded into the quantity of uncured rubber. A preferably non-conductive adhesive layer may be applied to selected portion of the power source, conductive element, and/or the antenna before the step of embedding in the uncured rubber.

Other exemplary embodiments of the present subject matter correspond to a method of providing a pneumatic tire with a mounting patch for mounting a monitoring device. Such a monitoring device may be configured to monitor conditions associated with the pneumatic tire. In accordance with such exemplary embodiment, a step is included for securing a cured rubber assembly to a selected portion of a pneumatic tire.

Additional aspects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 displays a top plan view of a first exemplary embodiment of a tire patch structure in accordance with the present subject matter;

FIG. 2 displays a side cross-sectional view of the first exemplary tire patch structure embodiment illustrated in FIG. 1;

FIG. 3 displays an end cross-sectional view of the first exemplary tire patch structure embodiment illustrated in FIG. 1;

FIG. 4 displays a top plan view of a second exemplary embodiment of a tire patch structure in accordance with the present subject matter;

FIG. 5 displays a side cross-sectional view of the second exemplary tire patch structure embodiment illustrated in FIG. 4;

FIG. 6 displays an end cross-sectional view of the second exemplary tire patch structure embodiment illustrated in FIG. 4;

Figure 7:
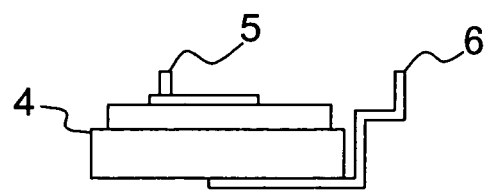
FIG. 7 displays a side elevation of a battery with connecting terminals suitable for use with the present subject matter.

Repeat use of reference characters throughout the present specification and appended drawings is intended to represent same or analogous features or elements of the invention.

DETAILED DESCRIPTION OF THE PREFERRED EMBODIMENTS

Reference will now be made in detail to the presently preferred embodiments of the subject matter comprising an improved system and method for mounting an electronics assembly within a tire structure. Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of a method for mounting an electronic patch assembly to the interior lining of a tire.

With particular reference to FIGS. 1–3, there are illustrated, respectively, top, side and end views of a first embodiment of an electronic assembly 1 in accordance with the presently disclosed subject matter. The electronic assembly 1 comprises two major components; a mounting patch 2 and a printed circuit board (PCB) 3 for supporting variously selected electronic components. In accordance with some embodiments of the present technology, a battery 4, employed as a power source for the associated tire electronics, is, at least partially, embedded in mounting patch 2 using a process that will be more fully described later. Battery 4, in addition to providing power for the associated tire electronics also functions, in one embodiment, as a physical support structure for the printed circuit board that supports the tire electronics in a manner as hereafter described.

A particular technique for securing battery 4 in the mounting patch 2 will be described with reference to FIGS. 7–9. As is seen from FIGS. 7–9, battery 4 is a generally flat, circular battery and is provided with connecting terminals 5, 6, secured to upper and lower portions of the battery. Battery 4 may be a long life lithium battery or any other type of battery that is suitable for providing energy to additional tire electronics. Connecting terminals 5, 6 may be soldered, spot-welded or secured in any other suitable manner to the battery to provide an electrical connection to the battery. Thus secured to the battery 4, the connection terminals 5, 6 provide not only an electrical connection from the battery to the circuitry mounted on the printed circuit board, but also supply, in one embodiment of the present subject matter, a convenient support structure for the printed circuit board. This exemplary embodiment of the mounting arrangement for the printed circuit board 3 is best illustrated in FIG. 10.

Figure 8:
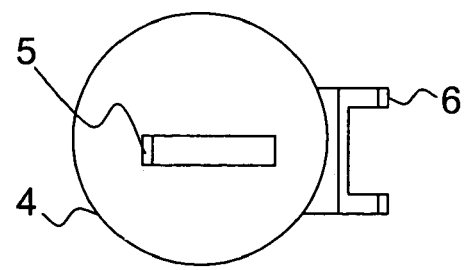
FIG. 8 displays a top plan view of the battery shown in FIG. 7.
Figure 9:
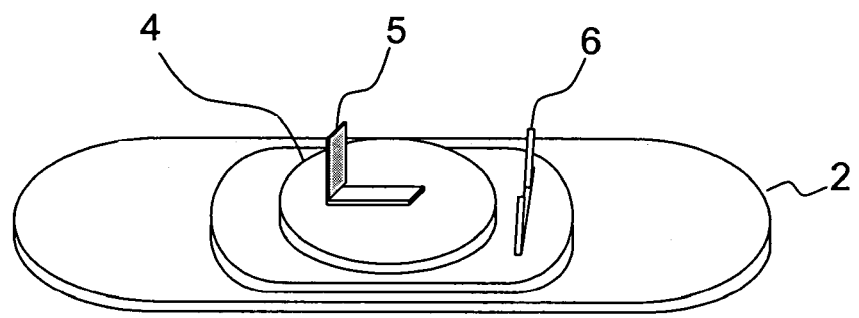
FIG. 9 displays an isometric view of a mounting patch portion of the present subject matter with exposed battery connections.

As can be seen most clearly from FIGS. 7 and 9, in one exemplary embodiment of the presently disclosed subject matter, battery 4 is supplied with connection terminals 5, 6 which are configured in such a manner as to be secured to opposite sides of battery 4 and bent at selected angles such that the free ends of the connecting terminals 5, 6, i.e. the ends of the connecting terminals 5, 6 opposite to those connected to the battery 4, terminate on the same side of the battery 4. With this configuration of the free ends of the connecting terminals, the battery 4 may be encased in the material forming the mounting patch 2 in such a manner as to permit the free ends of the connecting terminals 5, 6 to be exposed outside the material forming the mounting patch 2. This positioning of the battery 4 and exposed connecting terminals 5, 6 can most clearly be seen in FIG. 9.

As previously noted, battery 4 is at least partially encased in mounting patch 2, which is composed of a rubber composition. In a preferred embodiment, mounting patch 2 is composed of a non-conductive rubber. Alternatively, mounting patch 2 may be composed of a non-conductive elastomer or any other suitable material that is compatible with, and may be secured to, the innerliner of a tire. Battery 4 is secured within the mounting patch as the mounting patch 2 is constructed by first coating selected portions of the battery 4 with a chemical adhesive and then placing the coated battery into an appropriate quantity of uncured rubber. Thereafter sufficient temperature and pressure are applied to the uncured rubber to effect curing of the rubber to form the mounting patch 2 and, concomitantly, secure containment of the battery 4. Preferably, the chemical adhesive is a non-conductive adhesive that is capable of bonding to both rubber and metal. In a preferred embodiment, the chemical adhesive is a Chemlok® 252X, brand adhesive, such as manufactured by Lord Corporation.

Figure 10:
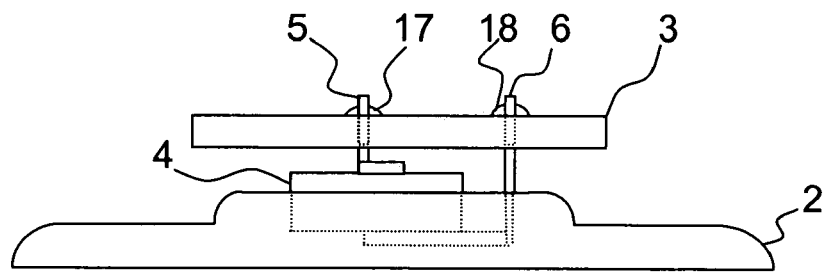
FIG. 10 displays a side elevation of an exemplary tire electronics assembly, particularly illustrating the use of battery connection terminals to support a printed circuit board portion of the assembly.

As shown in FIG. 10, battery terminals 5, 6 extend from the generally flat top surface of battery 4 in a substantially perpendicular fashion and through PCB 3 and may be soldered thereto as illustrated at 17, 18 to form a stable interconnecting relationship thereto.

Alternative embodiments of the present subject matter provide different mounting techniques for the printed circuit board as presented hereafter, but all share a basic concept, that is, that the relatively heavy battery has been moved from it's previous location as a part of the electronics on a printed circuit board to a location within the mounting patch. This positioning of the battery results in an overall structure with a lower center of gravity than previous tire electronic assemblies, thus having increased mechanical stability and survivability in a tire environment.

As best illustrated in FIG. 2, one alternative technique for securing the printed circuit board 3 to the mounting patch 2 is to directly glue the printed circuit board 3 to the mounting patch 2 and/or the upper surface of battery 4 with a suitable adhesive layer 19. Yet another technique contemplated by the present subject matter for securing the printed circuit board 3 to the mounting patch 2 is by way of hook and loop fasteners. Velcro® brand fastener is a common such hook and loop fastener and may be used in this environment to secure the printed circuit board 3 to the mounting patch 2 and/or an exposed upper surface of battery 4.

As previously noted, the present technology encompasses a tire electronics assembly comprising a two-part combination of a patch mounting portion and an electronics portion. The electronics portion of the monitoring system, as illustrated in FIG. 1, may include electronic components generally illustrated at 8, 9 and 10, which may be mounted on the printed circuit board 3. It should be appreciated that a greatest or lesser number of electronic components than illustrated in FIG. 1 may be utilized, and such components may be provided in a variety of different positions across PCB 3.

One example of the type of electronic components 8, 9, 10 provided on PCB 3 corresponds to various condition-responsive devices, including but not limited to sensors, transducers, acoustic devices (e.g. saw devices), or other components that provide some sort of output in response to changes in input conditions associated with a tire or corresponding wheel assembly environment. Such condition-responsive devices can be used to monitor any number of tire or wheel characteristics, including but not limited to, temperature, pressure, number of tire revolutions, vehicle speed, or the level of three-dimensional static and dynamic forces (such as sidewall deflection or tire displacement) acting on or associated with tire structure. Environmental conditions monitored may include temperature and air pressure and tire or vehicle specific conditions such as rotational speed, total miles traveled, time/temperature relationships and other parameters. The electronics included on the printed circuit board may also include such elements as a microprocessor, memory modules, revolution counters, RFID transponder, GPS, flashing light assemblies, data transmitter and/or receiver circuitry, and other components necessary to provide data and identification communications to an external reader. As best illustrated in FIGS. 1 and 2 the printed circuit board and all of the various components mounted thereon are encapsulated in a protective material 15 in such a manner that the components are fixed and immovable relative to one another during normal operation of the tire monitoring assembly.

As noted above, one of the elements associated with the electronics assembly is a data transmitter and/or receiver component. In order to accommodate transmission of signals to and/or from the tire monitoring assembly, one or more antenna elements 20, is cured, along with battery 4, into the material forming the mounting patch for the tire monitoring assembly. As best seen from FIG. 1, antenna 20 is generally shaped in the form of an "S" so as to provide flexibility and better protection of the antenna from breakage as the mounting patch flexes in use as a result of being secured to the inner lining of a tire it should be appreciated that other antenna configurations, such as but not limited to straight-wired, helical, undulating, or other configurations may also be utilized.

In addition, as a further hedge against circuit disruption due to flexing of the mounting patch in use, electrical connections, such as connection 22 connecting the antenna 20 to the printed circuit board, within the mounting patch, as well as the encapsulated printed circuit board, may-be constructed of flexible conductive materials. These flexible conductive materials may include springs and other conductors made of fatigue-resistant metal. Moreover, in one exemplary embodiment, these flexible conductive materials may be helical, undulating, looping, or any shape that allows end-to-end flexing and stretching while avoiding the destructive concentration of stress or fatigue. In another exemplary embodiment, the flexible conductive materials may consist of a flexible conductive elastomer compound, for example, an elastomer filled with conductive particles. Regardless of the form taken by the flexible conductive connection materials, the materials should be embedded in or surrounded by non-conductive rubber or elastomer material. For purposes of this disclosure, the term "non-conductive" as it relates to materials encasing, embedding or surrounding conductive or electronic elements means that the material has sufficiently good insulating properties relative to the particular electrical circuit being constructed such that the material does not cause unacceptable degradation to the performance of the circuit.

In the preferred implementation of the presently disclosed subject matter, selected materials in contact with rubber or elastomer material are bonded to the material during any curing process by appropriate surface preparation and bonding chemistry. One example of a preferred bonding chemistry is the use of the previously mentioned Chemlok® 252X brand product as manufactured by Lord Corporation as an adhesive coating material for the various elements to be cured into the materials of the mounting patch assembly.

With reference now to FIGS. 4–6, there are illustrated, respectively, top, side and end views of a second exemplary embodiment of a tire electronics assembly 41 in accordance with a second embodiment of the presently disclosed subject matter. As best illustrated in FIGS. 4 and 5, the second exemplary embodiment of the presently disclosed tire electronics assembly differs from the first embodiment as illustrated in FIGS. 1–3 principally by the inclusion of two batteries 44A, 44B, each at least partially embedded within the mounting patch portion 42 of the tire electronics assembly 41. As in the first embodiment of the presently disclosed subject matter, the second exemplary electronics assembly embodiment includes a separate mounting patch portion 42 and an electronics portion 46. Batteries 44A and 44B are separately embedded into the mounting patch portion 42 of the assembly using techniques similar to those of the first embodiment. In particular, the batteries 44A and 44B are prepared for encasement within the material of the mounting patch portion 42 of the assembly 41 by coating selected portions of the batteries with an adhesive bonding material prior to curing the batteries into the patch material. As in the first exemplary embodiment of the presently disclosed subject matter, a number of electrical connections may be provided within the mounting patch of the second exemplary embodiment as well as the electronics portion 46 of the tire electronics assembly and may include electrical connections that result in serial or parallel connection of the batteries 44A, 44B as well as connections between the batteries 44A, 44B and the circuitry portion of the tire electronics assembly and connections from the electronics portion of the tire monitoring assembly to antenna(s) (not shown) which may also be embedded in the mounting patch. These connections are not illustrated in the second embodiment of FIGS. 4–6 for simplicity. Also, as in the first embodiment, electrical connection elements may consist of flexible conductive elements such as metallic springs or conductive elastomers as previously described in conjunction with the first exemplary embodiment of the tire monitoring assembly. All electrical connections and elements including batteries, antennas, and all other included electrical components within the mounting patch and electronics portions of the tire monitoring assembly may be encased in or surrounded by non-conductive material as previously defined so as not to adversely impair the operation of the various elements. And finally, the electronics portion 46 of the tire electronics assembly may be secured to the mounting patch 42 via an adhesive layer 19 as in the first exemplary embodiment or by hook and loop fasteners as also previously mentioned with respect to the first exemplary embodiment.

Figure 11:
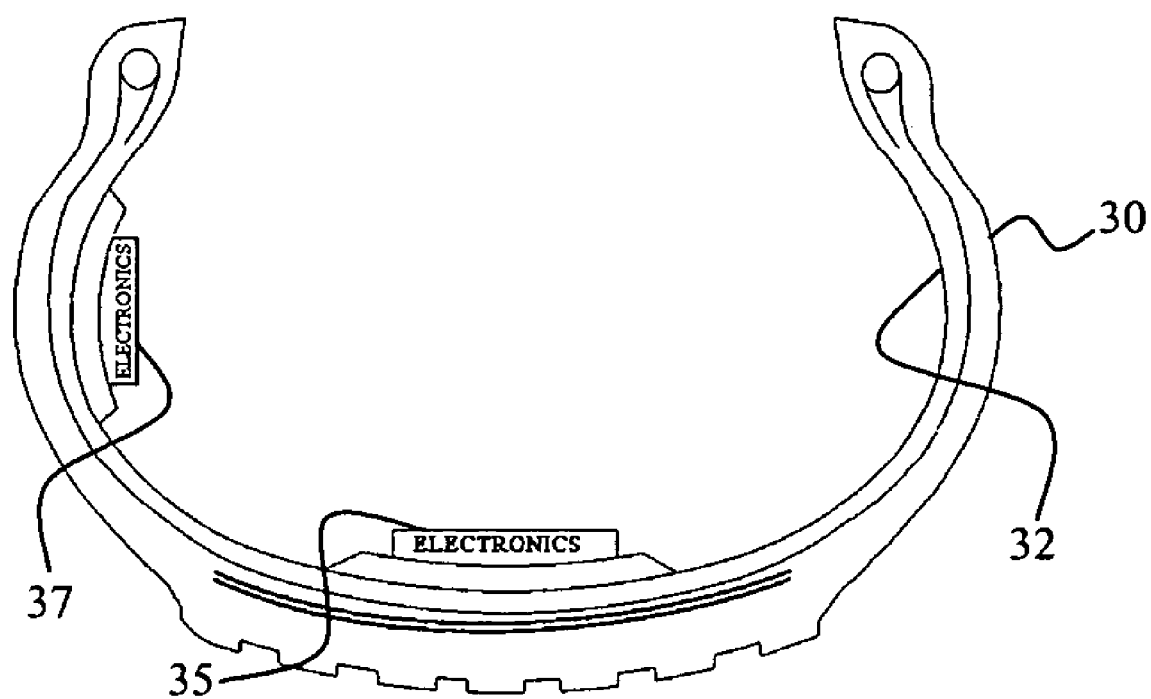
FIG. 11 displays a cross section of an exemplary pneumatic tire, illustrating alternative mounting locations for the tire electronics assembly.

Now with reference to FIG. 11, an exemplary embodiment of the present invention is illustrated wherein a tire electronics assembly 35 is mounted within a pneumatic tire 30. As shown in FIG. 11, tire 30 includes an innerliner 32. The electronics assembly disclosed herein may be mounted at various locations within the pneumatic tire; two of these locations are illustrated at the crown portion 35 of the tire and near the sidewall portion 37. As will be appreciated by those of ordinary skill in the art, the tire electronics assembly system may be mounted at any convenient location on the innerliner of the tire, the two locations shown merely being exemplary of such possible mounting locations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of making a mounting patch for mounting an electronic assembly to the inner liner of a pneumatic tire, the method comprising the steps of:
   providing a power source;
   coupling at least one pair of connecting terminals to the power source;
   embedding the power source and a portion of at least one of the connecting terminals into a quantity of uncured rubber;
   curing the uncured rubber by applying sufficient heat and pressure to the uncured rubber such that the power source and a portion of at least one of the connecting terminals are secured in the rubber, and
   coupling an electronic tire monitoring assembly to the pair of connecting terminals outside the cured rubber.

2. The method of claim 1, wherein said step of providing comprises providing at least one battery as the power source.

3. The method of claim 1, wherein said step of providing comprises providing a pair of batteries as the power source.

4. The method of claim 1, further comprising the step of:
   applying an adhesive layer on selected portions of the power source prior to the step of embedding.

5. The method of claim 1, further comprising the step of:
   applying a non-conductive adhesive layer on selected portions of the power source prior to the step of embedding.

6. The method of claim 1, further comprising the steps of:
   providing an antenna element; and
   embedding the antenna element into the quantity of uncured rubber.

7. The method of claim 6, further comprising the step of:
   applying an adhesive layer to selected portions of the antenna element prior to the step of embedding the antenna into the quantity of uncured rubber.

8. The method of claim 6, further comprising the step of:
   applying a non-conductive adhesive layer to selected portions of the antenna element prior to the step of embedding the antenna element into the quantity of uncured rubber.

9. The method of claim 6, further comprising the step of shaping the antenna element with undulations prior to embedding into the quantity of uncured rubber whereby the undulations allow longitudinal stretching of the antenna element.

10. The method of claim 9, further comprising the step of:
    applying a non-conductive adhesive layer to selected portions of the antenna element prior to the step of embedding the antenna element into the quantity of uncured rubber.

11. The method of claim 1, further comprising the steps of:
    providing a conductive element; and
    embedding the conductive element into the quantity of uncured rubber.

12. The method of claim 11, further comprising the step of:
    applying a non-conductive adhesive layer to selected portions of the conductive element prior to the step of embedding the conductive element into the quantity of uncured rubber.

13. The method of claim 11, further comprising the step of selecting the conductive element to be provided from the group consisting of springs, fatigue-resistant metals, and elastomers.

14. A method of providing a pneumatic tire with a mounting patch for mounting a monitoring device for monitoring conditions of the pneumatic tire comprising the steps of:
    providing a pneumatic tire;
    providing a power source;
    coupling at least one pair of connecting terminals to the power source;
    embedding the power source and a portion of at least one of the connecting terminals into a quantity of uncured rubber;
    curing the uncured rubber by applying sufficient heat and pressure to the uncured rubber such that the power source and a portion of at least one of the connecting terminals are secured in the rubber;
    securing the cured rubber to the pneumatic tire, and
    coupling an electronic tire monitoring assembly to the pair of connecting terminals outside the cured rubber.

15. The method of claim 14, wherein said step of providing a power source comprises providing at least one battery.

16. The method of claim 14, wherein said step of providing a power source comprises providing a pair of batteries.

17. The method of claim 14, further comprising the step of:
    applying an adhesive layer to selected portions of the power source prior to the step of embedding.

18. The method of claim 14, further comprising the step of:
    applying a non-conductive adhesive layer to selected portions of the power source prior to the step of embedding.

19. The method of claim 14, further comprising the steps of:
    providing an antenna element; and
    embedding the antenna element into the quantity of uncured rubber.

20. The method of claim 19, further comprising the step of:
    applying an adhesive layer to selected portions of the antenna element prior to the step of embedding the antenna into the quantity of uncured rubber.

21. The method of claim 19, further comprising the step of:
   applying a non-conductive adhesive layer to selected portions of the antenna element prior to the step of embedding the antenna element into the quantity of uncured rubber.

22. The method of claim 19, further comprising the step of shaping the antenna element with undulations prior to embedding into the quantity of uncured rubber whereby the undulations allow longitudinal stretching of the antenna element.

23. The method of claim 22, further comprising the step of:
   applying a non-conductive adhesive layer to selected portions of the antenna element prior to the step of embedding the antenna element into the quantity of uncured rubber.

24. The method of claim 14, further comprising the steps of:
   providing a conductive element; and
   embedding the conductive element into the quantity of uncured rubber.

25. The method of claim 24, further comprising the step of:
   applying a non-conductive adhesive layer to selected portions of the conductive element prior to the step of embedding the conductive element into the quantity of uncured rubber.

26. The method of claim 24, further comprising the step of selecting the conductive element to be provided from the group consisting of springs, fatigue-resistant metals, and elastomers.

* * * * *